(12) United States Patent
Beredimas (10) Patent No.: US 11,190,484 B2
(45) Date of Patent: Nov. 30, 2021

(54) ENHANCED LARGE SCALE NETWORK ADDRESS TRANSLATION (NAT) SYSTEM FOR PROCESSING PACKETS BETWEEN ROUTER AND TRANSMISSION CONTROL PROTOCOL/INTERNET PROTOCOL (TCP/IP) NETWORK

(71) Applicant: Citrix Systems, Inc., Fort Lauderdale, FL (US)

(72) Inventor: Ioannis Beredimas, Salonika (GR)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 55 days.

(21) Appl. No.: 16/451,895

(22) Filed: Jun. 25, 2019

(65) Prior Publication Data
US 2020/0403969 A1    Dec. 24, 2020

Related U.S. Application Data

(63) Continuation of application No. PCT/GR2019/000043, filed on Jun. 19, 2019.

(51) Int. Cl.
*H04L 29/12* (2006.01)
*H04L 12/743* (2013.01)
*H04L 29/06* (2006.01)

(52) U.S. Cl.
CPC ........ *H04L 61/256* (2013.01); *H04L 45/7453* (2013.01); *H04L 61/2007* (2013.01); *H04L 69/16* (2013.01)

(58) Field of Classification Search
CPC ............. H04L 61/2503; H04L 45/7453; H04L 61/2532; H04L 29/12066; H04L 61/256;
(Continued)

(56) References Cited

U.S. PATENT DOCUMENTS 8,289,968 B1 * 10/2012 Zhuang ............... H04L 61/2532
370/392
2009/0031032 A1   1/2009 Shanmugham
(Continued)

FOREIGN PATENT DOCUMENTS

EP        3865180 A2     9/1998

OTHER PUBLICATIONS

International Search Report and Written Opinion dated Sep. 18, 2019 for PCT/GR2019/000043 filed Jun. 19, 2019; pp. 9.

*Primary Examiner* — Ian N Moore
*Assistant Examiner* — Sun Jong Kim
(74) *Attorney, Agent, or Firm* — Hoffman Warnick LLC (57) ABSTRACT

A system, method and program product for provisioning a large scale network address translation (LSN) system. A system is disclosed that processes packets between a router and a TCP/IP network. The system includes a plurality of LSN appliances and a flow processor embedded in each of the plurality of LSN appliances. Each flow processor includes: a hash function that determines an owner appliance from the plurality of LSN appliances for a request received from the router based on a private IP address of the request; a look-up table that that determines the owner appliance from the plurality of LSN appliances for a response received from the TCP/IP network based on a public IP address of the response; and a packet routing system that routes a received request or a received response to the owner appliance.

20 Claims, 6 Drawing Sheets

(58) Field of Classification Search
CPC ............. H04L 61/2007; H04L 67/1002; H04L 61/1511; H04L 67/2814; H04L 67/288; H04L 61/25; H04L 61/2514; H04L 67/1023

See application file for complete search history.

(56) References Cited

U.S. PATENT DOCUMENTS

2012/0191873 A1    7/2012  Himeno et al.
2013/0170451 A1*   7/2013  Krause .................... H04L 69/14
                                                    370/329
2018/0069782 A1    3/2018  Wosik

* cited by examiner

ENHANCED LARGE SCALE NETWORK ADDRESS TRANSLATION (NAT) SYSTEM FOR PROCESSING PACKETS BETWEEN ROUTER AND TRANSMISSION CONTROL PROTOCOL/INTERNET PROTOCOL (TCP/IP) NETWORK

BACKGROUND OF THE DISCLOSURE

The Internet Protocol Version 4 (IPv4) has been in place for the Internet since 1983, and uses a 32-bit field for addressing purposes, which theoretically allows for up to 4.3 billion connected systems. While this seemed sufficient at the time, the explosion of Internet usage in the 1990s and number of connected devices (e.g., mobile phones, Internet of Things, etc.) in the 2000s has meant that it is not possible to assign a unique IPv4 address to all connected systems. The IPv6 protocol introduced a 128-bit addressing field, but still has not been widely adapted. Network Address Translation (NAT), which is deployed at the customer edge of the network, was introduced as a stop gap solution.

NAT leverages the notion of private IP addresses, such as the ones introduced with Request for Comment 1918 (RFC1918). Private IP addresses are a small reserved subset of the 32-bit address block (a few tens of millions) and are not publically routable. Accordingly, because private IP addresses need only be unique within a local network, a large organization with thousands of connected devices can operate with a small number of public IP address. NAT utilizes customer premises equipment (CPE) to translate between public and private IP addresses at the edge of the local network for communications occurring between the organization's devices and other Internet connected systems beyond the local network.

The downside with deploying NAT at the customer edge is that its effectiveness is somewhat limited. Firstly, a public IP is still required for connectivity of each distinct, connected network. Accordingly, NAT cannot be used to reduce public IP addresses for isolated devices connected in a point-to-point manner (e.g., mobile phones, industrial sensors in remote locations, etc.). Secondly, while the savings can be significant for large businesses and networks with hundreds of connected devices, the savings are rather small when it comes to home networks or small offices with only a handful of connected devices.

Large Scale NAT (LSN) alleviates the above issues to some extent by allowing carriers and service providers to deploy NAT at the network edge, as oppose to the customer edge. Specifically, using LSN, all connected systems on the customer edge of a service provider, e.g., CPEs, mobile phones, etc., are assigned a private IP address. The private IP address is only translated to a public IP address when it reaches an LSN appliance at the network edge. A dynamic routing protocol advertisement is used so that response traffic to the public IP address can reach the LSN appliance and be reverse-mapped to the appropriate private IP address.

As is the case with all carrier-grade computer systems, LSN appliances are typically deployed in a high-availability, active-standby mode to provide for redundancy in case of a unit's catastrophic failure or scheduled maintenance. In addition, LSN appliances have a well-defined capacity in terms of throughput, new sessions per second, concurrent sessions, etc. As is the case with all computer systems, if capacity is insufficient, (vertical) scale-up or (horizontal) scale-out is needed. Scale-up refers to replacing an appliance with a higher-capacity one, whereas scale-out refers to adding more appliances and operating in an N+1 manner, with multiple active appliances.

While there are inherent benefits of being able to scale-out instead of scaling up, scaling out an LSN system in which more than one LSN appliance is utilized presents unique challenges. In particular, both outbound communications and inbound communications may be received by the set of LSN appliances in an arbitrary manner, i.e., the LSN system has no control over which appliance receives a given flow. For instance, ECMP (equal-cost multi-path routing) may be utilized to forward communications to the LSN system, which from the LSN system perspective, results in a completely arbitrary appliance selection.

BRIEF DESCRIPTION OF THE DISCLOSURE

Aspects of this disclosure provide a system, method and program product for implementing a technically enhanced LSN system that manages packet flow among a set of LSN appliances, can be easily scaled out, requires minimal computational and storage overhead, and requires no additional equipment.

A first aspect of the disclosure provides a system for processing packets between a router and a TCP/IP network and includes a plurality of LSN appliances. A flow processor is embedded in each of the plurality of LSN appliances, and includes: a hash function that determines an owner appliance from the plurality of LSN appliances for a request received from the router based on a private IP address of the request; a look-up table that determines the owner appliance from the plurality of LSN appliances for a response received from the TCP/IP network based on a public IP address of the response; and a packet routing system that routes a received request or a received response to the owner appliance.

A second aspect of the disclosure provides a method for processing packets between a router and a TCP/IP network using a plurality of LSN appliances. The process includes receiving a request from the router at a first LSN appliance arbitrarily selected from the plurality of LSN appliances, wherein the request includes a private IP address; applying a hash function to the private IP address to determine an owner appliance from the plurality of LSN appliances, and routing the request to the owner appliance; and forwarding the request to the TCP/IP network from the owner appliance using a public IP address associated with the owner appliance. The process further includes receiving a response from the TCP/IP network at a second LSN appliance arbitrarily selected from the plurality of LSN appliances, wherein the response includes the public IP address; examining a look-up table at the second LSN appliance to determine the owner appliance based on the public IP address; routing the response to the owner appliance from the second LSN appliance; and forwarding the response along with the private IP address from the owner LSN appliance to the router.

A third aspect of the disclosure provides a computer program product stored on a computer readable storage medium and deployable to each of a plurality of LSN appliances to process packets between a router and a TCP/IP network. The computer program product includes: program code that implements a hash function to determine an owner appliance from the plurality of LSN appliances based on a private IP address of a request received from the router; program code that implements a look-up table to determine the owner appliance from the plurality of LSN appliances based on a public IP address of a response received from the TCP/IP network; and program code that forwards a received request or a received response to the owner appliance.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for provisioning an enhanced LSN system that includes a set of LSN appliances, each instrumented with smart features to manage network address translation at a network edge. The enhanced LSN system can be easily implemented and scaled out to allow LSN appliances to be added as demand requires. Further, the implementation requires minimal computational overhead, and no additional equipment to manage session tracking.

Figure 1:
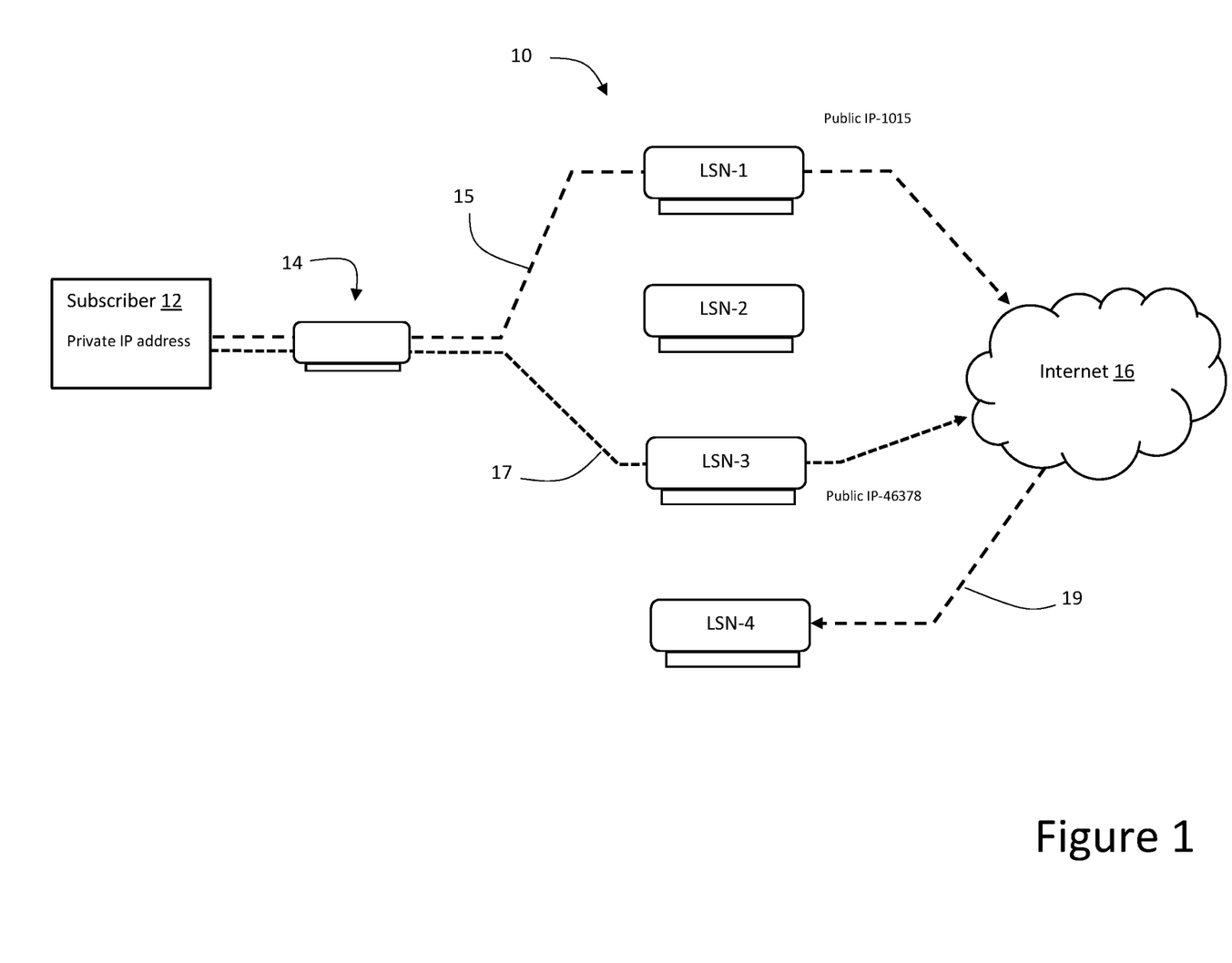
FIG. 1 shows challenges of implementing an LSN system.

As noted, challenges arise using a system of LSN appliances because each appliance has a unique set of public IP addresses and sessions must be managed so that outbound requests having private IP addresses can be correlated with associated inbound responses having public IP addresses. If corresponding requests and responses are not handled by the same appliance, managing sessions can become extremely burdensome. FIG. 1 illustrates this challenge, in which an LSN system 10 having four LSN appliances (LSN-1, LSN-2, LSN-3 and LSN-4) attempts to route packets between a wireless router 14 and the Internet 16. Outbound communications from a subscriber 12 having a private IP address are passed through the wireless router 14 to an arbitrarily selected LSN appliance (e.g., using ECMP), which assigns a public IP address and forwards the communication to the Internet 16. As shown, a first outbound communication 15 passes through LSN-1 that assigns a first public IP address (Public IP-1015) and a second outbound communication 17 passes through LSN-3 that assigns a second public IP address (Pubic IP-46378). Assuming both communications 15, 17 are associated with the same session (e.g., a user interacting with a banking website, playing an online game, etc.), issues will arise since the end application will be seeing different public IP addresses.

Similar issues exist for inbound communications, which will likewise be arbitrarily received by any of the LSN appliances. In the example shown, inbound communication 19 having public IP-1015 is received by LSN-4, which has no awareness of the existing session set up on LSN-1.

One approach for managing such an LSN system 10 would be to utilize session sharing in which the set of LSN appliances share and track different sessions amongst the group. Unfortunately, sharing sessions amongst LSN appliances is complex and expensive to implement. Another option would be to implement an additional piece of hardware, such as a border router, to ensure that the same LSN appliance is handling correlated inbound and outbound traffic. Public IP address network slicing could be utilized to assign ranges of public IP addresses to each appliance. This approach however not only requires an additional device such as a border router that sits between the LSN system and the Internet to direct inbound communication to the correct LSN appliance, but is also complex to scale when additional appliances are added. For example, scaling an LSN system from four to five LSN appliances requires a complete reworking of the network slices and a respective network redesign.

Figure 2:
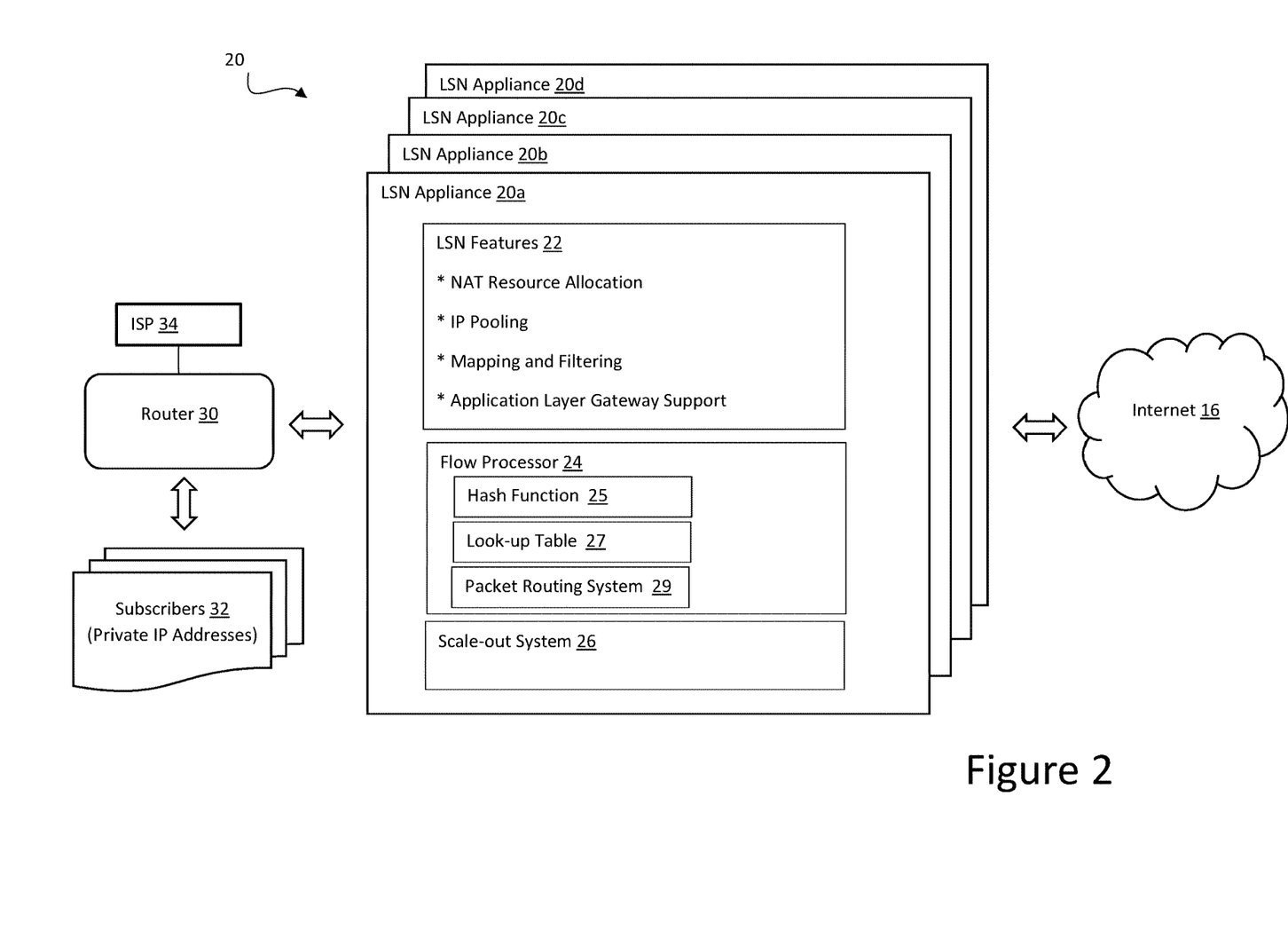
FIG. 2 shows an enhanced LSN system in which each appliance is equipped with flow processor, in accordance with an illustrative embodiment.

Referring to FIG. 2, an enhanced LSN system 20 is shown that includes a set of LSN appliances 20*a*, 20*b*, 20*c* and 20*d*, each adapted to translate between a relatively large set of private IPv4 addresses and a relatively small set of public IPv4 addresses. In this example, LSN system 20 sits between a router 30 and the Internet 16. Router 30 is for example provisioned by an Internet service provider (ISP) 34 that provides Internet access to subscribers 32 via homes, businesses, mobile device customers, etc. Each of the subscribers 32 are assigned one or more private IP addresses by the ISP 34 and are connected to the Internet 16 through the ISP's access network. Commercial subscribers may be directly connected to the ISP's access network while non-commercial subscribers are typically behind customer-premises equipment (CPE), such as routers and modems, which may also implement NAT. For the purposes of this disclosure, router 30 may comprise any networking device that can forward data packets between computer networks.

Each of the LSN appliances 20*a*-*d* are configured to receive subscriber packets having private IP addresses destined for the Internet 16 and translate private IP addresses to public IP addresses. Each appliance 20*a*-*d* only tracks sessions that it owns and does not track sessions occurring on other appliances in the LSN system 20. Accordingly, each appliance 20*a*-*d* maintains a record of all active sessions owned by the appliance and maintains the mappings between subscriber (private) IP address and port, and NAT (public) IP address and port, for each session it owns. The owning appliance can recognize a response packet (received from the Internet 16) belonging to a particular session it owns, can translate from the public IP address to the subscriber private IP address, and can send the translated packet to the subscriber 32. Each LSN appliance 20*a*-*d* (e.g., appliance 20*a*) generally has no knowledge of sessions occurring on other appliances (e.g., appliances 20*b*-*d*). Each appliance generally is equipped with a set of LSN features 22, including, e.g., NAT resource allocation for allocating public IP address and ports, IP pooling for managing sessions for subscribers 32, mapping and filtering processes, and application layer gateway support for handling different communication protocols.

In order to implement a system of LSN appliances 20a-d, such as that shown, each appliance further includes a flow processor 24. Flow processor 24 enables the management of sessions across the set of appliances 20a-d and allows the LSN system 20 to be scaled out to add (or remove) appliances as necessary to meet demand. Flow processor 24 generally includes: a hash function 25 that determines an owner appliance (from the set of LSN appliances 20a-d) for an outbound request received from a subscriber 32 based on the private IP address of the request; a look-up table 27 that determines the owner appliance for an inbound response received from the Internet 16 based on a public IP address of the response; and a packet routing system 29 that forwards a received request or a received response from the receiving appliance to the owner appliance.

Also included is a scale-out system 26 that can be utilized to manage a scale-out process in which new appliances are to be added (or removed). In particular, when a new appliance is added, a set of scale-out commands can be received and processed by the scale-out system 26 on each appliance to update the hash function 25 and/or look-up table 27 as needed. Scale-out commands can also be used to reallocate public IP addresses amongst each of the appliances to, e.g., accommodate a new appliance.

Figure 3:
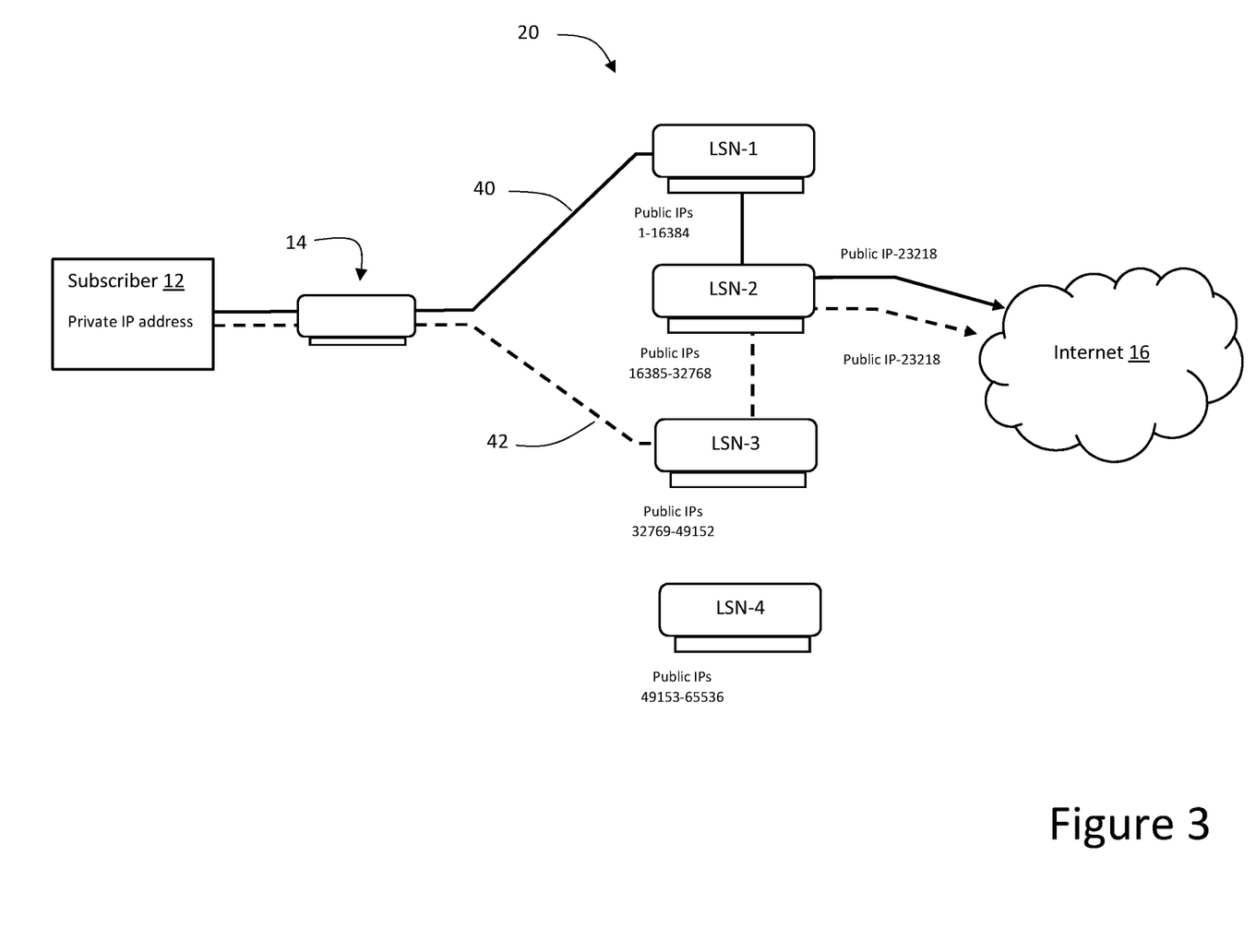
FIG. 3 shows an illustrative enhanced LSN system handling outbound communications using the flow processors, in accordance with an illustrative embodiment.

FIG. 3 depicts a cluster traffic distribution example showing how outbound requests are processed by the enhanced LSN system 20 detailed in FIG. 2. In the LSN system 20 shown, there are four appliances, and each appliance is assigned a range of public IP addresses, i.e., LSN-1 has addresses 1-16384, LSN-2 has address 16385-32768, etc. In this case, a subscriber 32 initiates a first flow 40 which is arbitrarily received by LSN-1. The hash function 25 implemented on LSN-1 determines that the appropriate owner appliance is LSN-2 based on the private IP address of the subscriber 32. The packet routing system 29 reroutes the packet to from LSN-1 to LSN-2, and LSN-2 performs a NAT operation and maps the subscriber's private IP address to a public IP address assigned to LSN-2, e.g., public-IP-23218. The packet (along with the assigned public IP address) is then forwarded to the Internet 16. Sometime thereafter, the subscriber 32 initiates a second flow 42 that is arbitrarily received by LSN-3. The hash function 25 implemented on LSN-3 determines that the appropriate owner appliance is LSN-2 for the subscriber's private IP address and the packet routing system forwards the packet to LSN-2. LSN-2 identifies that there is an existing mapping for the subscriber 32 and re-uses public-IP-23218. This process thus ensures that all outbound packets for a given subscriber 32 will be routed through a predetermined owner appliance, allowing for subscriber and public IP persistency.

Hashing function 25 may utilize any algorithm that can fairly distribute a large number of private IP addresses to a relatively small set of LSN appliances. One possible example includes a modulo operation, which finds the remainder after division of one number (i.e., the private IP address) by another number (i.e., total number of appliances). Thus, for a set of n appliances, the range of outputs is 0 to n−1 for all inputted private IP addresses. It is understood that other algorithms could likewise be utilized. Other hashing functions may include, e.g., consistent hashing such as a jump hash, a cache array routing protocol (CARP) hash function, etc.

Figure 4:
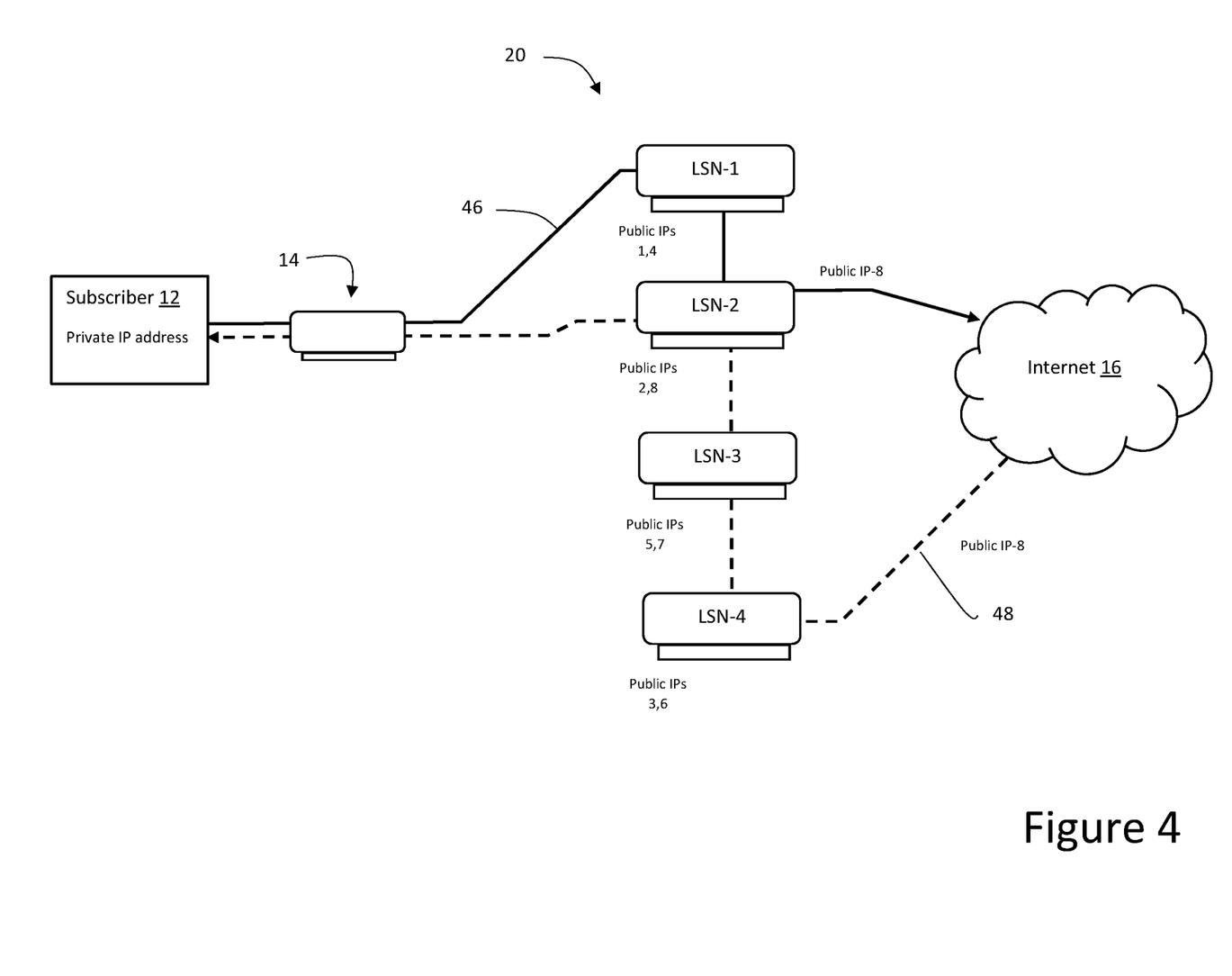
FIG. 4 shows the illustrative enhanced LSN system handling inbound communications using the flow processors, in accordance with an illustrative embodiment.

FIG. 4 depicts a cluster traffic distribution example showing how inbound responses from the Internet 16 are handled using the look-up table 27 installed on each appliance, e.g., as detailed in FIG. 2. For simplicity, assume each appliance is assigned only two public IP address, i.e., LSN-1 owns addresses 1,4; LSN-2 owns 2,8; LSN-3 owns 5,7; and LSN-4 owns 3,6. In this example it can be seen that the outbound communication 46 was rerouted through LSN-1 to LSN-2. At LSN-2, a NAT session was created and a public IP address was selected (e.g., public IP-8) for the outbound packet.

For the related inbound communication 48, the packet and its associated public IP address 8 is arbitrarily received by LSN-4. To determine the owner appliance, LSN-4 examines a look-up table 27 (FIG. 2) that maps appliances to public IP addresses. An illustrative look-up table 27 is shown in Table 1, in which it can be seen that public IP-8 is mapped to LSN-2.

TABLE 1

| appliance | Public IP addresses |
|---|---|
| LSN-1 | 1, 4 |
| LSN-2 | 2, 8 |
| LSN-3 | 5, 7 |
| LSN-4 | 3, 6 |

Appliances may be assigned public IP addresses in any manner, e.g., using a hash algorithm that fairly distributes public IP addresses to appliance nodes. Since the number of appliances and public IP addresses is well-known, the look-up table 27 can be easily precomputed and stored on each LSN appliance. Using this approach, each appliance processes packets for only the public IP addresses it owns. Table look-ups require only a small amount of computing overhead and the look-up table 27 itself requires only a small amount of storage space. For example, assuming four LSN appliances, a /16 public IP subnet (65536 IPs) and four bytes per IP address, a modest storage amount of 64 KB per appliance is needed (16384 entries, with 4 bytes for each LSN appliance).

As illustrated in FIG. 4, LSN-4 receives the response 48 and utilizes the look-up table 27 to determine the owner appliance for public IP-8. As shown in Table 1, it can be seen that LSN-2 is the owner appliance, and packet routing system 29 routes the packet from LSN-4 to LSN-2. LSN-2 processes the packet, recognizes that it belongs to a NAT session, reverse maps the public IP address to the private IP address, and sends the packet to the original subscriber 32. Hence, the precomputed look-up table 27 allows for LSN scale-out without any session sharing, stateless load balancing by the wireless router 14 or network slicing on the Internet side.

The look-up table 27 can be further extended with precomputed hash values for handling a single unit failure, as shown in Table 2. A consistent hash algorithm may be utilized to generate the extended table to ensure that only the failing appliance public IP addresses are redistributed. For example, as shown in Table 2, if LSN-1 fails, public IP addresses 1 and 8 are redistributed such that LSN-2 owns public IP addresses 2,8,1; LSN-3 owns 5,7,4; and LSN-4 owns 3,6. Accordingly, in case of an appliance failure in an N-appliance cluster, only $1/N^{th}$ of traffic is affected. Hence only 25% of the traffic is affected in the Table 2 example. Moreover, this approach can work without dedicated hot-standby appliances, and with all appliances being active at any given time.

TABLE 2

| node | Public IPs (no failure) | Public IPs (LSN-1 failure) | Public IPs (LSN-2 failure) | Public IPs (LSN-3 failure) | Public IPs (LSN-4 failure) |
| --- | --- | --- | --- | --- | --- |
| LSN-1 | 1, 4 |  | 1, 4, 2 | 1, 4 | 1, 4, 3 |
| LSN-2 | 2, 8 | 2, 8, 1 |  | 2, 8, 7 | 2, 8, 6 |
| LSN-3 | 5, 7 | 5, 7, 4 | 5, 7 |  | 5, 7 |
| LSN-4 | 3, 6 | 3, 6 | 3, 6, 8 | 3, 6, 5 |  |

As noted, very little memory is required to implement the look-up table 27. For instance, storing pre-calculated hash values to allow for a single appliance failure extends memory consumption by only 256 KB/appliance. Storing pre-calculated hash values to allow for two units to fail extends memory consumption by only 768 KB/appliance. Hence, for a 2+2 LSN cluster, the present approach addresses all the deficiencies of LSN scale-out with a mere consumption of 1088 KB of memory per appliance.

It can be mathematically shown that assuming N public IP addresses, M appliances and an M+3 redundancy scheme, the per appliance memory impact is calculated as follows:

$$4\frac{N}{M} + 4N + 2\frac{NM(M-1)}{M-2} + \frac{NM(M-1)(M-2)}{3(M-3)}.$$

Even assuming a somewhat extreme example of /8 public IP address block with a 7+3 LSN scale-out deployment, the total memory impact remains at 1 GB, which is modest considering that 1 TB on a single server is not uncommon.

Note that 1 GB reflects the amount of memory required to store all possible lookup tables, specifically one lookup table for ten active devices, ten lookup tables for nine active devices (since any of the ten devices may fail), forty-five lookup tables for eight active devices (there are forty-five unique device pairs in a ten-device population) and one-hundred-twenty lookup tables for seven active devices (there are one hundred and twenty unique device triplets in a ten-device population). Since at any given moment there is a single lookup table in use, memory utilization can be optimized further. For example, one could load the 10 MB "active" lookup table which corresponds to the current cluster state into more efficient memory (i.e. a CPU cache) and the remaining one hundred seventy five lookup tables into slower memory (i.e. RAM).

Figure 5:
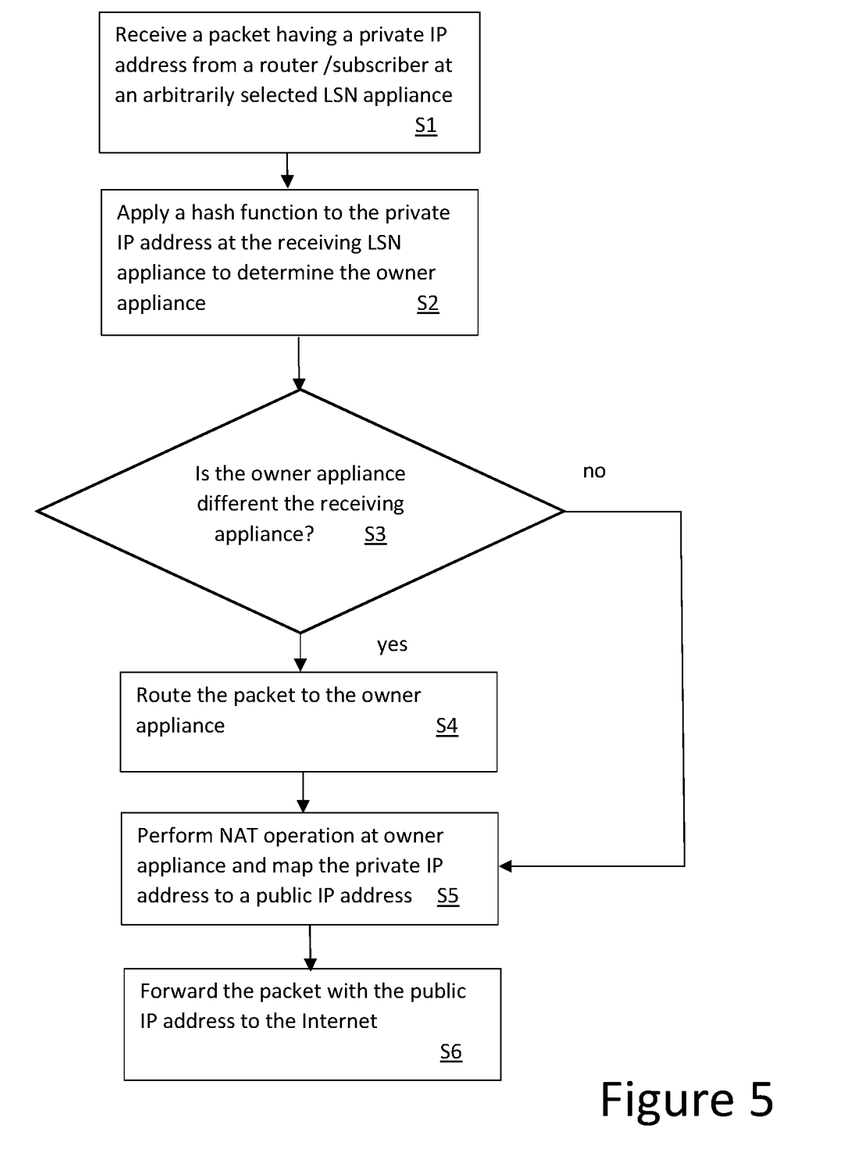
FIG. 5 depicts a flow diagram of process for handling outbound packets, in accordance with an illustrative embodiment.

FIG. 5 depicts a flow diagram of a process for handling outbound packets by the enhanced LSN system 20 (FIG. 2). At S1, a packet is received having a private IP address from a router/ISP subscriber at an arbitrarily selected ("receiving") LSN appliance. At S2, a hash function 25 is applied to the private IP address at the receiving LSN appliance to determine the owner appliance. At S3, a determination is made whether the owner appliance is different than the receiving appliance. If yes, then the packet is routed to the owner appliance at S4. Once the packet is routed, or if no at S3, a NAT operation is performed at S5 at the owner appliance and the private IP address is mapped to a public IP address. At S6, the packet with the public IP address is forwarded to the Internet.

Figure 6:
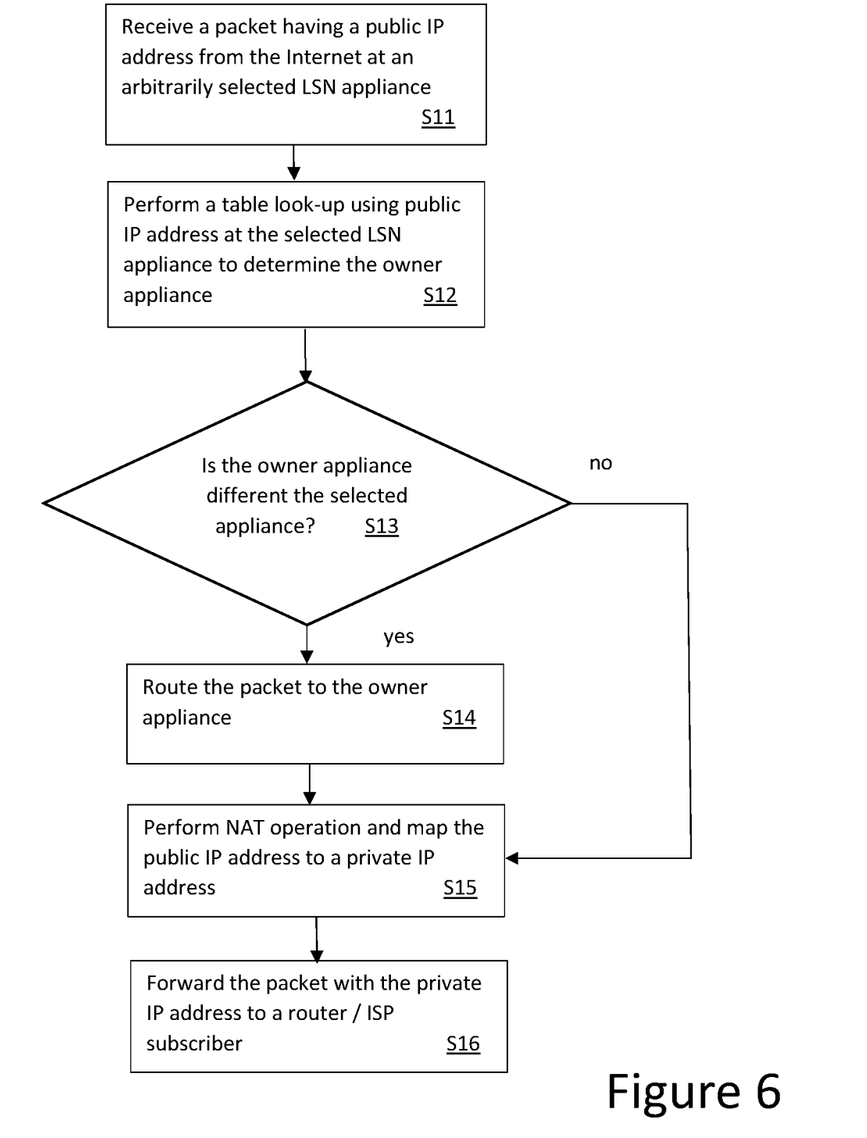
FIG. 6 depicts a flow diagram of process for handling inbound packets, in accordance with an illustrative embodiment.

FIG. 6 depicts a flow diagram of a process for handling inbound packets by the enhanced LSN system 20 (FIG. 2). At S11, a packet is received having a public IP address from the Internet 16 at an arbitrarily selected ("receiving") LSN appliance. At S12, a table look-up is performed using the public IP address at the receiving LSN appliance to determine the owner appliance. At S13, a determination is made whether the owner appliance is different that the receiving appliance. If yes, then the packet is routed to the owner appliance at S14. Once the packet is routed, or if no at S13, a NAT operation is performed at S15 at the owner appliance and the public IP address is mapped to a private IP address. At S16, the packet with the private IP address is forwarded to a router/ISP subscriber.

The enhanced LSN system 20 accordingly overcomes numerous challenges associated with NAT processing at the edge of a network. For example, the present approach eliminates the need for a stateless load balancing layer on the ISP subscriber side; eliminates the need for any sort of network slicing; eliminates any requirement for computationally prohibitive session sharing; eliminates the need for a hot-standby; and minimizes the traffic impact when an appliance fails.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The flow processor 24 and scale-out system 26 (FIG. 2) may be implemented by any type of computing system that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations. Flow processor 24 and scale-out system 26 may likewise be implemented either fully or partially in firmware or dedicated hardware, in which functionality is implemented using embedded processing.

LSN system 20 may be implemented in any network environment in which devices (i.e., subscribers) having assigned private IP addresses communicate with a TCP/IP network, such as the Internet, using public IP addresses. The LSN system 20 may for example be used to access a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for processing packets between a router and a transmission control protocol/Internet protocol (TCP/IP) network, comprising:
    a plurality of large scale network address translation (LSN) appliances in communication with the router; and
    a flow processor embedded in each of the plurality of LSN appliances, wherein each flow processor includes:
        a hash function that determines an owner appliance from the plurality of LSN appliances for a request received from the router based on a private IP address of the request;
        a look-up table that determines the owner appliance from the plurality of LSN appliances for a response received from the TCP/IP network based on a public IP address of the response,
        wherein the hash function and the look-up table at each of the plurality of LSN appliances operate independently to determine the owner appliance; and
        a packet routing system that routes a received request or a received response to the owner appliance.

2. The system of claim 1, wherein the owner appliance creates a session that translates between the public IP address and the private IP address, and wherein each of the plurality of LSN appliances does not track sessions occurring on other LSN appliances.

3. The system of claim 1, wherein the hash function includes one of a modulo operation or a consistent hash operation.

4. The system of claim 1, wherein the look-up table utilizes a pre-calculated hash table created with a consistent hash function in which each LSN appliance has a unique set of associated public IP addresses.

5. The system of claim 4, wherein the pre-calculated hash table further includes calculated hash values for determining the owner appliance in the event of a failure of an LSN appliance of the plurality of LSN appliances.

6. The system of claim 4, wherein the pre-calculated hash table evenly distributes public IP addresses of a failed LSN appliance among a remaining set LSN appliances of the plurality of LSN appliances.

7. The system of claim 1, wherein the request and response are received by arbitrarily selected LSN appliances.

8. A method for processing packets between a router and a transmission control protocol/Internet protocol (TCP/IP) network using a plurality of large scale network address translation (LSN) appliances, comprising:
    receiving a request from the router at a first LSN appliance arbitrarily selected from the plurality of LSN appliances, wherein the router is separate from the plurality of LSN appliances and the request includes a private IP address;

applying a hash function to the private IP address to determine an owner appliance from the plurality of LSN appliances, and routing the request to the owner appliance;

forwarding the request to the TCP/IP network from the owner appliance using a public IP address associated with the owner appliance;

receiving a response from the TCP/IP network at a second LSN appliance arbitrarily selected from the plurality of LSN appliances, wherein the response includes the public IP address;

examining a look-up table at the second LSN appliance to determine the owner appliance based on the public IP address;

routing the response to the owner appliance from the second LSN appliance; and forwarding the response along with the private IP address from the owner LSN appliance to the router, wherein the processes of applying the hash function and examining the look-up table are performed independently to determine the owner appliance.

9. The method of claim 8, wherein the owner LSN appliance creates a session that translates between the public IP address and the private IP address, and wherein each of the plurality of LSN appliances does not track sessions occurring on other LSN appliances.

10. The method of claim 8, wherein the hash function includes one of a modulo operation and a consistent hash function.

11. The method of claim 8, wherein the look-up table utilizes a pre-calculated hash table in which each LSN appliance has a unique set of associated public IP addresses.

12. The method of claim 11, wherein the pre-calculated hash table further includes calculated hash values for determining the owner LSN appliance in the event of a failure of an LSN appliance of the plurality of LSN appliances.

13. The method of claim 11, wherein the pre-calculated hash table evenly distributes public IP addresses of a failed LSN appliance among all remaining LSN appliances of the plurality of LSN appliances.

14. The method of claim 8, wherein the hash function and the look-up table are consistently implemented on each LSN appliance.

15. A computer program product stored on a non-transitory computer readable storage medium and deployable to each of a plurality of large scale network address translation (LSN) appliances to process packets between a router and a transmission control protocol/Internet protocol (TCP/IP) network, the computer program product, which when executed by a computer processor, comprises:

program code that implements a hash function to determine an owner appliance from the plurality of LSN appliances based on a private IP address of a request received from the router, wherein the router is separate from the plurality of LSN appliances;

program code that implements a look-up table to determine the owner appliance from the plurality of LSN appliances based on a public IP address of a response received from the TCP/IP network, wherein the hash function and the look-up table operate independently to determine the owner appliance; and program code that forwards a received request or a received response to the owner appliance.

16. The computer program product of claim 15, further comprising program code to create a session that translates between the public IP address and the private IP address, wherein each of the plurality of LSN appliances does not track sessions occurring on other LSN appliances.

17. The computer program product of claim 15, wherein the hash function utilizes one of a modulo operation or a consistent hash function.

18. The computer program product of claim 15, wherein the look-up table includes a pre-calculated hash table in which each LSN appliance has a unique set of associated public IP addresses.

19. The computer program product of claim 18, wherein the pre-calculated hash table further includes calculated hash values for determining the owner appliance in the event of a failure of an LSN appliance of the plurality of LSN appliances.

20. The computer program product of claim 18, wherein the pre-calculated hash table evenly distributes public IP address of a failed LSN appliance among all remaining LSN appliances of the plurality of LSN appliances.

* * * * *